United States Patent [19]

Dane

[11] Patent Number: 4,743,095

[45] Date of Patent: May 10, 1988

[54] CLIP FASTENERS FOR PARABOLIC DISH REFLECTOR PANELS

[76] Inventor: John A. Dane, 8823 Shellie La., Boise, Id. 83704

[21] Appl. No.: 68,208

[22] Filed: Jun. 25, 1987

[51] Int. Cl.$^4$ ............................ F24J 2/12; G02B 7/18
[52] U.S. Cl. ................................... 350/613; 350/614; 350/631
[58] Field of Search ..................... 350/613, 614, 631; 343/912, 915, 916; 126/438

[56] References Cited

U.S. PATENT DOCUMENTS

| | | | |
|---|---|---|---|
| 2,806,135 | 9/1957 | Bolsey | 350/613 |
| 4,021,816 | 5/1977 | Peck | 343/912 |
| 4,173,968 | 11/1979 | Steward | 126/438 |
| 4,350,412 | 9/1982 | Steenblik et al. | 350/613 |
| 4,558,551 | 12/1985 | Sevelinge et al. | 350/631 |
| 4,568,156 | 2/1986 | Dane | 350/614 |

FOREIGN PATENT DOCUMENTS 2738597  3/1979  Fed. Rep. of Germany ...... 350/614

Primary Examiner—Jon W. Henry

[57] ABSTRACT

A parabolic reflector having support structure, preferably mounted on wheels for rotation, for supporting a dish framework to which is mounted a multiplicity of adjacently placed reflector members for focusing solar rays on a linear collector. The reflector members are in the form of sheets having the shape of funnel sections, i.e., infundibuliform, to provide a reflective concave surface. Each of the reflector members define slots which are aligned with and adjacent like slots of adjacently placed reflector members for receiving bendable tabs of clip fasteners.

The clip fasteners, besides serving to securely connect adjacent reflector members, also include apertures for receiving rivets or other fasteners for attachment to the underlying parabolic framework. The clips include a reflective surface for maximizing reflector efficiency.

The linear collector includes a cylindrical, elongated shell for receiving focused solar rays. Heat exchange media flows upward into the collector through a central tube which is separated from the exit passage adjacent the shell by means of solid insulative material to prevent heat exchange between the incoming and exiting heat exchange media.

5 Claims, 7 Drawing Sheets

CLIP FASTENERS FOR PARABOLIC DISH REFLECTOR PANELS

BACKGROUND OF THE INVENTION

1. Field of the Invention

This invention relates generally to solar reflectors and more particularly to reflectors of funnel section shape; reflectorized clips for attachment of the reflectors to underlying framework; and to linear collectors therefore.

2. Description of the Prior Art

Parabolic reflectors may be categorized into those utilizing point collectors and those utilizing linear collectors. Point collectors are typified by U.S. Pat. Nos. 4,171,876; 4,295,709; and 4,372,772 issued to D. E. Wood and U.S. Pat. No. 4,252,107 issued to R. H. Horton. Where solar rays are focused along a line or on a column, as typified by U.S. Pat. No. 4,089,325 issued to G. Brola; U.S. Pat. No. 4,173,968 issued to W. G. Steward and U.S. Pat. No. 4,599,995 issued to this applicant, John A. Dane, focusing becomes more critical. G. Brola suggests a funnel-shaped reflector made of several sectors but does not suggest use of such reflectors in stacked array on a parabolic reflector, thus greatly limiting the use of his reflector. The Steward disclosure utilizes a substantially hemispherical reflector having a compound curve, and the Dane reference suggests a multiplicity of reflector bowls for focusing of solar rays on a linear collector. Because of molding and forming problems, particularly in the use of metal reflectors, utilized because of their strength and durability, cost of construction is high resulting in poor cost efficiency.

SUMMARY OF THE INVENTION

The present invention overcomes the problems of focusing efficiency and cost efficiency by providing a parabolic reflector which includes a parabolic dish framework to which is mounted a multiplicity of reflector members, each of said members provided with an infundibuliform reflective surface, ie., a surface having but a single concave curve in the shape of a funnel section. Such members, mounted on a parabolic framework, provide the solar ray capturing advantage of a parabolic dish with the cost efficiency of reflector members having but a single curvature. This is made possible with reflector members having an height equal to or less that the height of the linear collector upon which the rays are focused. A novel means for fastening the reflector members to each other and to the parabolic framework comprising clips, having a highly reflective surface, which are received within aligned slots defined by the reflector members, add efficiency in manufacture as well as preserving focusing efficiency. A novel linear collector is also provided which includes internal insulation for preventing heat loss from exiting heat exchange media to colder incoming media.

It is therefore a principal object of the present invention to provide a parabolic reflector having a parabolic dish framework to which a plurality of reflector members, having an infundibuliform reflective surface, are attached.

It is also a primary object of the present invention to provide clip fasteners for the rapid, convenience, and cost efficient attachment of reflector members to each other and to an underlying framework.

Another object of the present invention is to provide a linear collector having a heat transference shell; a central tubular passage for intake of heat transference media; and an annular passage for outlet of heated media which is insulated from the intake passage.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
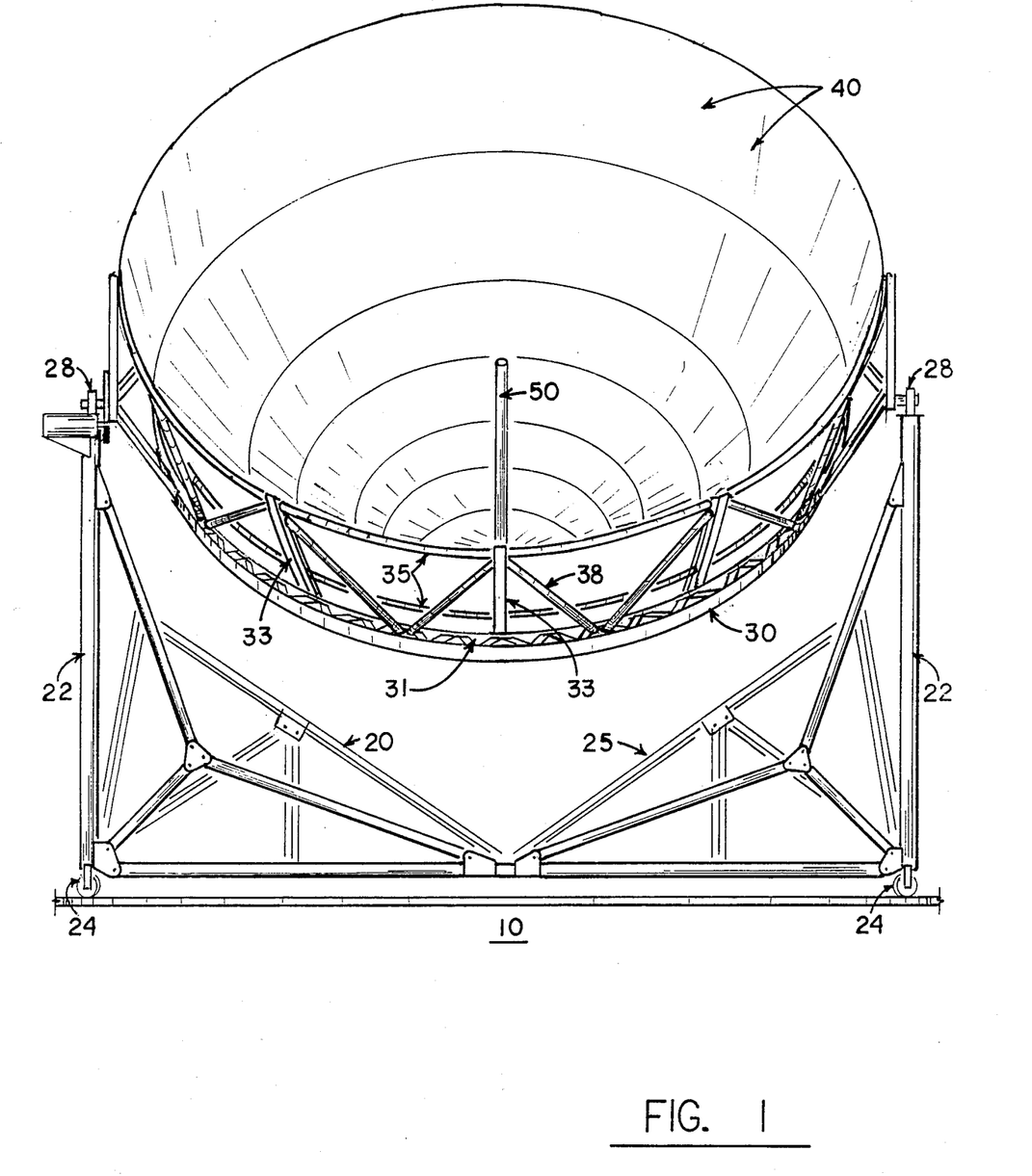
FIG. 1 is a perspective view of a parabolic reflector made in accordance with the present invention, showing individual reflector members, in part.
Figure 2:
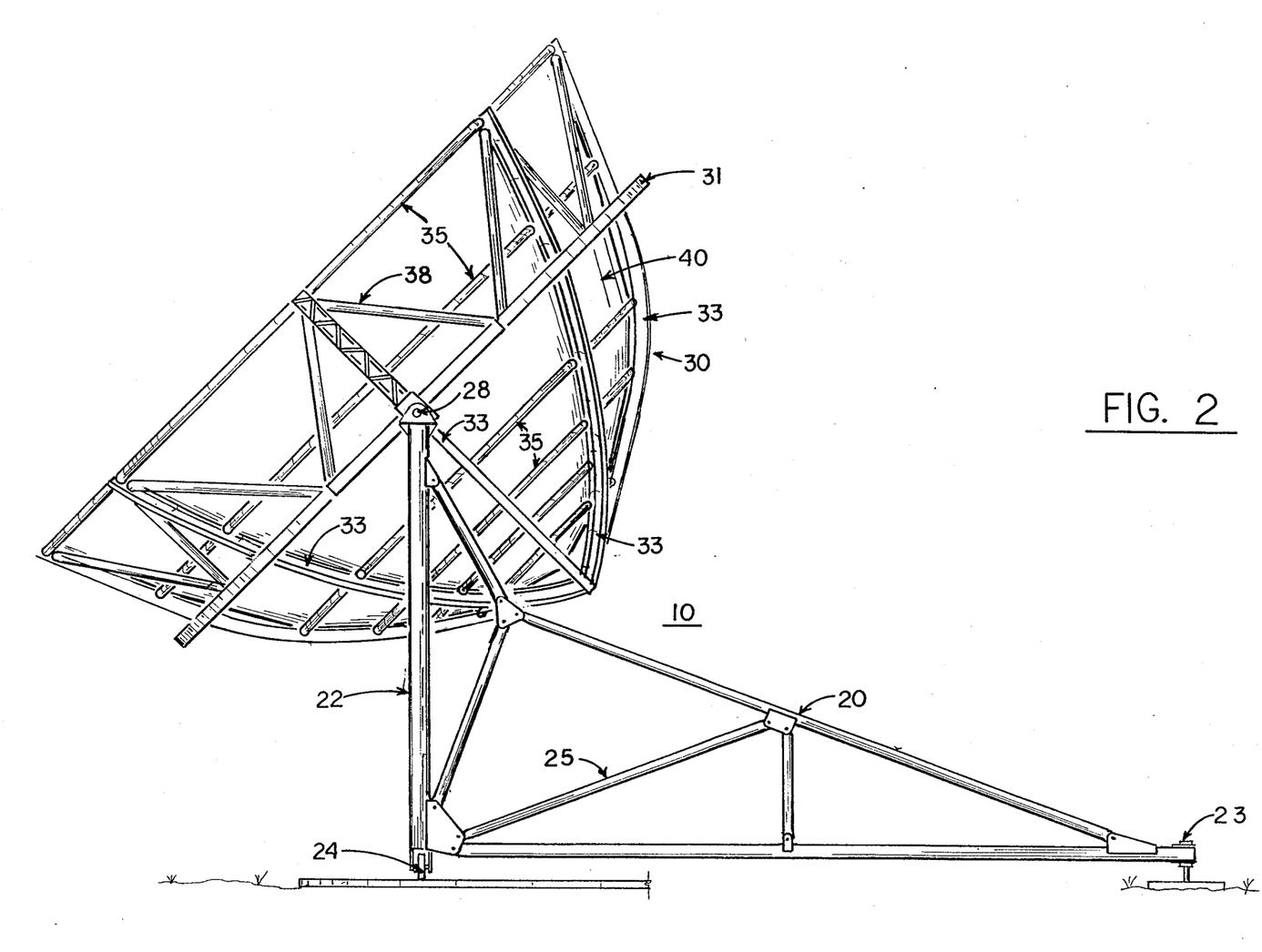
FIG. 2 is a side view of the parabolic reflector shown in FIG. 1, showing the support structure and framework.
Figure 3:
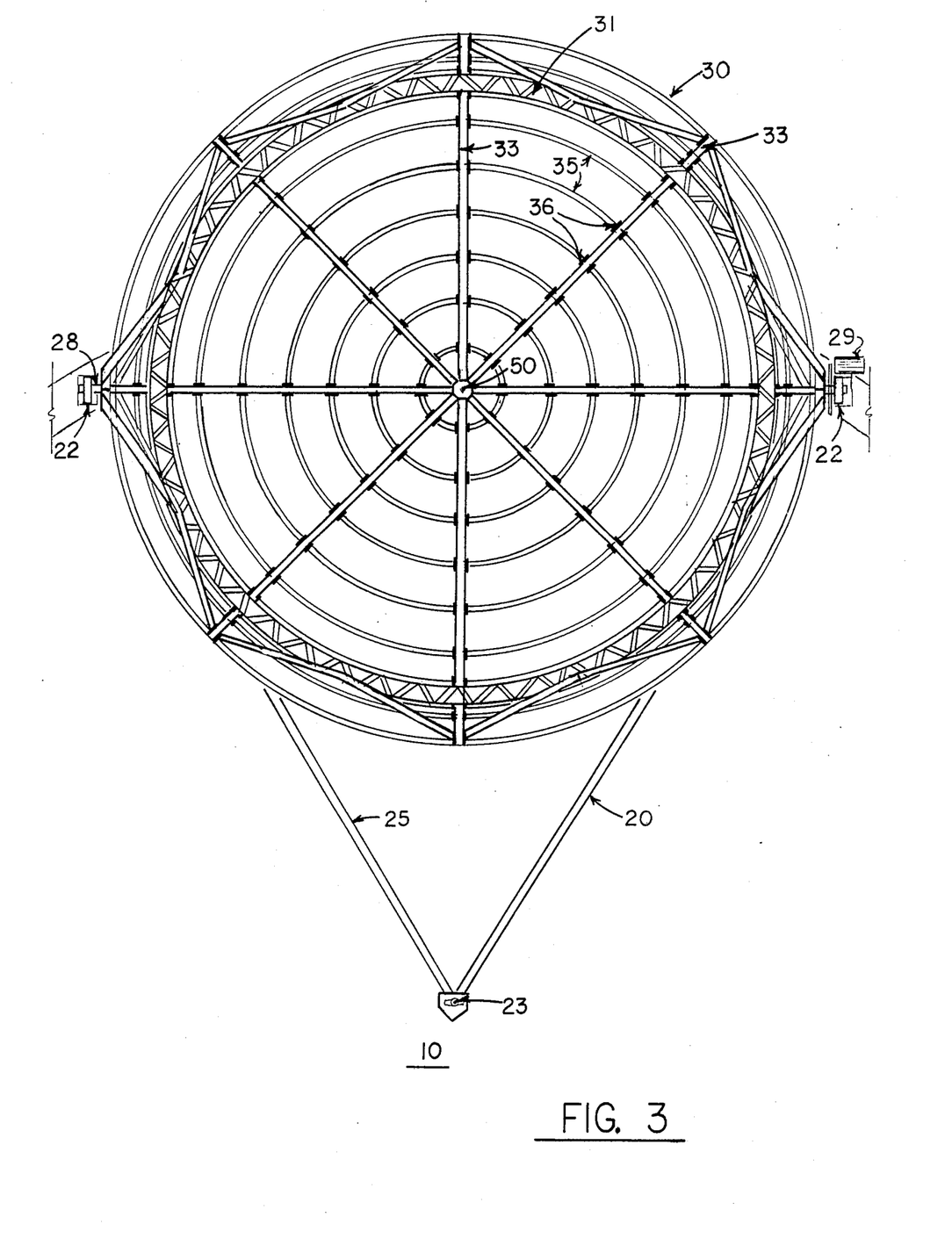
FIG. 3 is a plan view of the parabolic reflector shown in FIG. 1, showing the support structure and framework.

Referring to the drawings and FIGS. 1-3 in particular, an embodiment to be preferred of a parabolic dish reflector 10, made according to the present invention is disclosed. Parabolic reflector 10 includes support structure 20 carrying a parabolic dish framework 30 to which is mounted reflector members 40 and linear collector 50.

Support structure 20, in the preferred embodiment, includes a pair of upstanding, laterally spaced support columns 22 mounted upon pivot wheels 24 for rotation about a pivot member 23. A support carriage, designated generally by the numeral 25 connects the support columns to the pivot member. Carriage 25 may also be used to provide a support for inlet and outlet conduits for conducting heat exchange media to and from collector 50 in its communication with an external heat exchanger, not a part of this invention.

Figure 4:
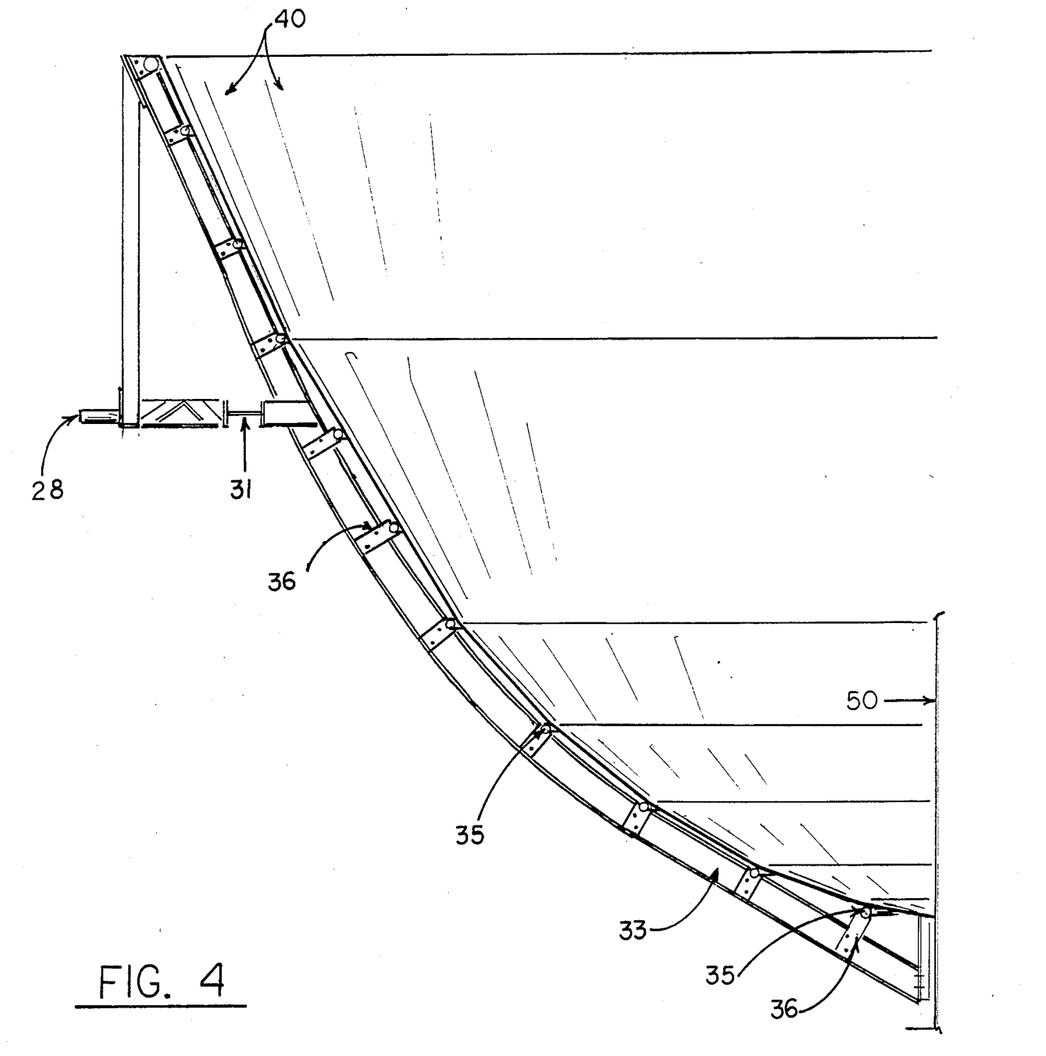
FIG. 4 is a partial section of the parabolic reflector showing position of framework rings relative to the support structure and framework.

Pivotally mounted upon support columns 22 by means of pivot pins 28 is parabolic dish framework 30. Framework 30 is pivoted to a selected altitude by means of an altitude drive motor 29. The drive motor and azimuth drive motors, not shown, may be controlled by photo-optic circuitry or other conventional means for proper positioning of the dish relative to the sun. Framework 30 includes a plurality of support arms 33, an axle ring 31, and a plurality of reflector member support rings 35. Support arms 33 are equidistantly spaced and radially extending from a common apex at the bottom of the dish. Eight support arms are included in the embodiment shown, which has a diameter of ten meters. Opposing pairs of arms are formed about a parabolic curve. Mounted to the outer surfaces of each of the support arms is an axle ring 31 which gives structural support to the arms and also provides attachment to support columns 22 by means of pivot pins 28, as shown in FIGS. 2 and 3. Support rings 35 are mounted onto the interior surfaces of support arms 33 or caused to stand off the support arms by means of braces 36 to conform to the longitudinally straight back of reflector members 40 as shown to advantage in FIG. 4. The support rings are in the form of circular pipes vertically spaced parallel to one another about the parabola from the bottom to the top of the dish. Obliquely mounted struts 38, mounted between the upper most support ring and the axle ring provide additional stability.

Figure 5:
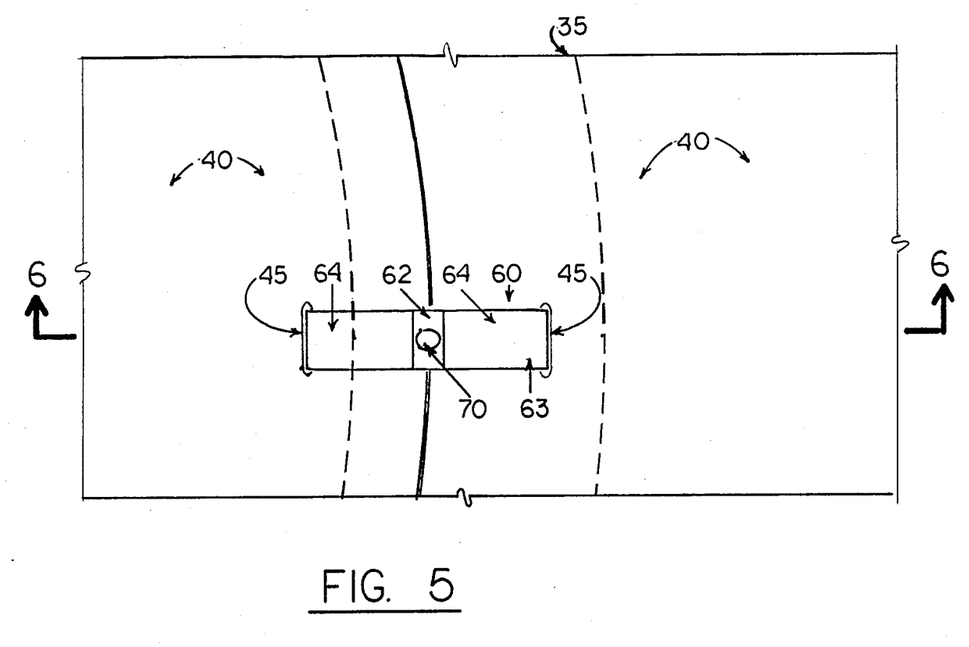
FIG. 5 is a plan view of partial sections of two adjacent reflector members showing the fastening structures for attachment of reflector members together and to the framework.
Figure 6:
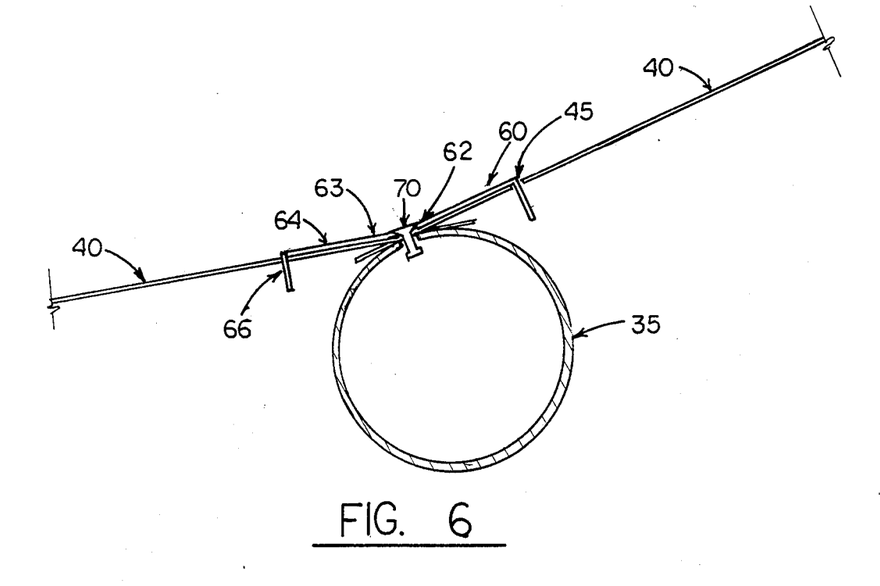
FIG. 6 is a cross section taken along lines 6—6 of FIG. 5.
Figure 8:
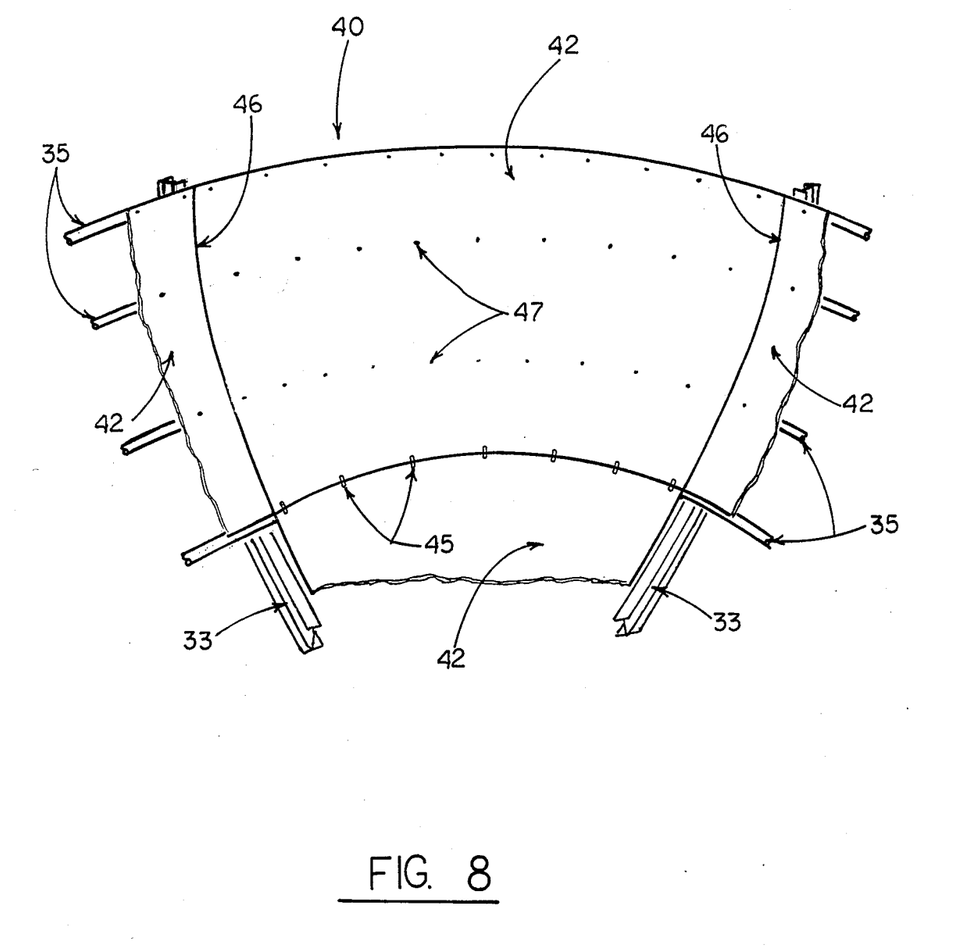
FIG. 8 is a perspective view of a reflector member showing attachment between two support rings.

Reflector members 40, shown to advantage in FIGS. 5, 6, and 8, have a configuration like a section of a funnel, having a concave reflective surface which is the mirror image of the surface of a conical section. Such configuration is hereinafter referred to and is referred to in the appended claims as being infundibuliform, ie., having the shape of a funnel section. Each member 40 is preferably constructed of aluminum alloy sheeting, having a concave inner surface 42 and a parallel convex outer surface 44 and characterized by a single curvature, defining a straight line from top to bottom in longitudinal cross section. The material preferred for construction is manufactured and sold under the trademark Coilzak ® having a highly polished surface utilizing a process known under the mark Alzak ®. Such construction provides a strong, wind-resistant, lightweight, and highly reflective reflector. The reflectors each have straight sides 46 which divert outwardly from bottom to top. The reflectors are placed adjacent one another, either in an abutting or overlapping relationship to cover the entire surface of framework 30, except for placement of collector 50. Each of the reflectors 40 are of a height equal to or less than the height of collector 50 so that the collector may receive all rays focused from each reflector. Machined or otherwise formed in each reflector member are a plurality of slots 45, located adjacent selected edges of each reflector member in alignment with or in registry with slots of adjacent reflector members for attachment of the reflector to the underlying framework by means of clips 60. Rivets 47 may be used to attach reflector members to the underlying framework except where reflector members are set at an angle to one another, in which case clips 60 are required.

Each of the clips 60, seen to advantage in FIGS. 5 and 6, may be made of a malleable sheet metal and include a central fastener engaging section 62, a pair of oppositely disposed arms 64; each arm provided with a terminal bendable tab 66. Section 62 is preferably provided with an aperture for receiving a rivet, screw, bolt, or other fastening means 70 for attachment of the clip and hence reflector members 40 to support rings 35, shown by dotted lines in FIG. 5. Tabs 66 are inserted through respective slots 45 in adjacent reflector members and are then bent under the member to clamp the clip to the reflector member. The clips are each provided with a highly reflective top surface 63 for reflecting solar rays to the collector and therefore increase the efficiency of the entire parabolic reflector. The clips are preferably made of the same material as the reflector members, ie., aluminum alloy.

Figure 7:
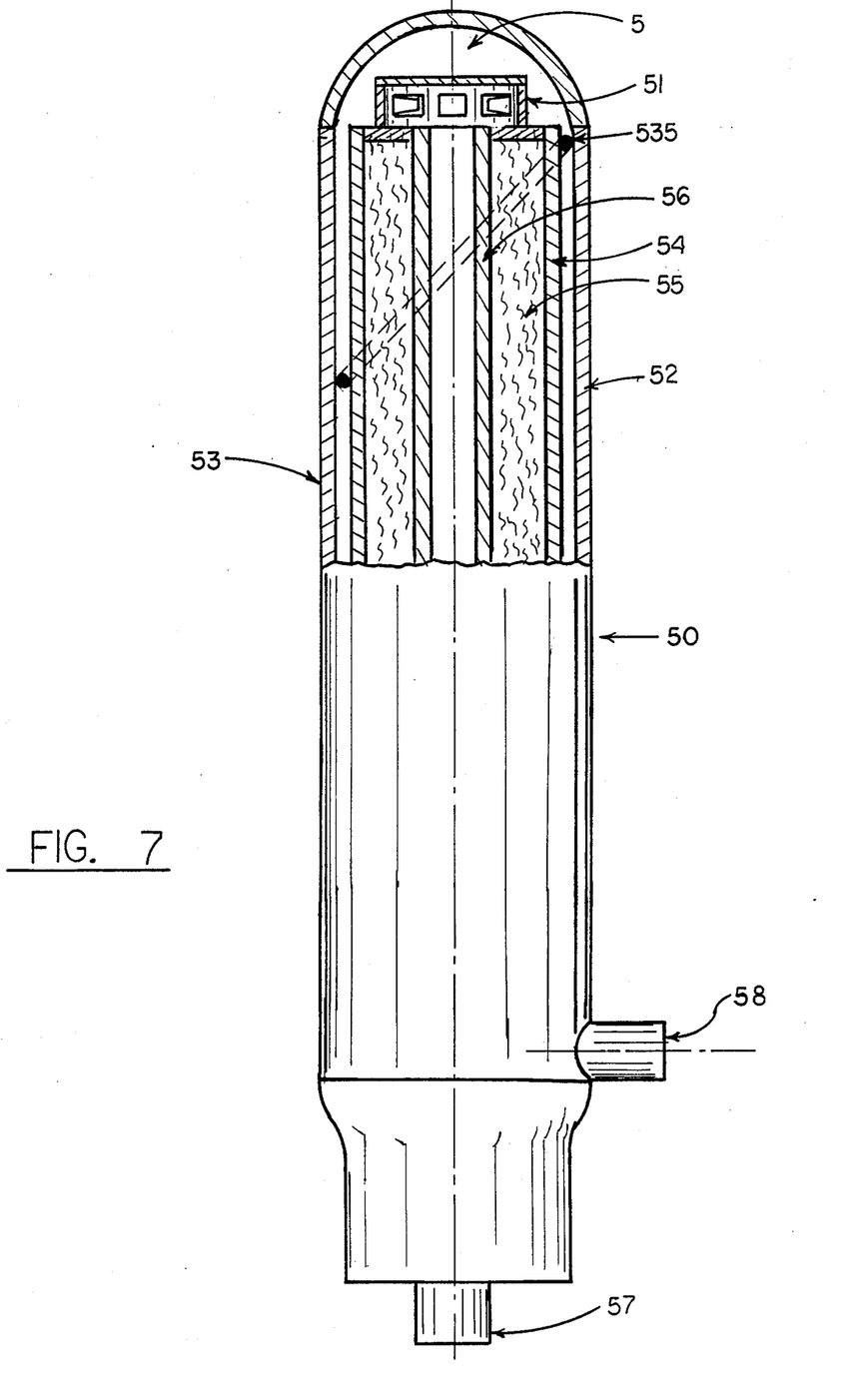
FIG. 7 is a side view in partial section of the linear collector.

Referring now to FIG. 7, the linear collector 50, made according to the present invention is shown. Collector 50, mounted upon framework 30, includes an elongated cylindrical shell 52; a first tubular member 54 concentrically located within the shell; a second tubular member 56 concentrically spaced within the first tubular member; insulating means 55 contained within an annular enclosure defined between the first and second tubular member; and inlet port 57 and outlet port 58 for receiving fluid media from and conveying fluid media to an external heat exchanger, not shown. Outer shell 52 is provided with an heat absorptive outer coating 53 for absorbing heat from rays focused from reflector members 40 and clips 60 and may also be provided with a pressure release valve, not shown. The shell, in cooperation with first tubular member 54 defines an annular outlet passage for heat exchange between the shell and heat exchange media 5 flowing out through the passage. A baffle or deflector 51, located above the fluid outlet of the second tubular member, may be utilized to prevent flow turbulence. A helical baffle 535, wound about and between the shell and first tubular member 54, assures efficiency in heat absorption in providing a tortuous path for the exiting heat exchange media. To prevent loss of heat from the exiting media in the annular outlet passage to the relatively cold incoming media in second tubular member 56, insulation means 55, preferably calcium silicate or other solid insulation, is placed in the enclosure defined by the first and second tubular members. The enclosure is sealed at top and bottom to prevent contact between the insulation and the heat exchange media 5.

In operation, the parabolic reflector 10 is controlled by suitable sun-tracking means which activates motors controlling the azimuth of the reflector about pivot member 23 as well as the altitude of the reflector. Solar rays impinging upon reflector members 40 are reflected and focused onto the absorptive surface 53 of shell 52 of collector 50. It is to be noted that even though the reflector members have an infundibuliform configuration and therefore have but a single curvature, that, because their height is equal to or less than the height of the collector, that all solar rays striking the concave reflective surface of each of the reflector members are focused upon the collector 50. Solar rays striking the reflective top surfaces of the multiplicity of clips 60 are also reflected to the collector to maximize collection from all of the interior surface of the dish. Heat exchange media, pumped from the external heat exchanger, enters intake port 57 and flows upward through the center of the collector and out through the top of second tubular member 56, striking baffle 51, and flowing helically downward through the passage defined by the shell 52, the first tubular member 54, and baffle 535, exiting the collector at outlet portal 58 where it is returned to the external heat exchanger. It is obvious that the heat collected may be used as a power source, a heat source, or any of a number of purposes.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come with the meaning and range of equivalency of the claims are therefore to be embraced therein.

I claim:

1. In a reflector assembly including a plurality of reflector members adjacently mounted on a support framework, each of said reflector members provided with a plurality of slots, means for affixing said reflector members to said framework comprising:
- a multiplicity of clips, each of said clips provided with at least two tabs, each tab insertible through a respective slot of adjacent reflector members for joining adjacent members and each clip provided with an aperture; and
- a multiplicity of fasteners, each fastener receivable within said a respective aperture of each of said clips for attachment of each of said clips and hence said reflector members to said framework.

2. The affixing means as described in claim 1 wherein each of said clips is constructed of malleable metal for bending said clip to a selected angle and wherein each of said tabs of each of said clips is bendable to engage said reflector members in a clamped relationship.

3. The affixing means as described in claim 1 wherein each clip is provided with a reflective upper surface.

4. The affixing means as described in claim 1 wherein each of said fasteners comprises a rivet.

5. The affixing means as described in claim 1 wherein each clip includes a central fastener engaging section; a pair of arms oppositely extending from said central section; and a pair of tabs, each of said tabs defining the end portion of said arms.

* * * * *